United States Patent [19]
Rapata

[11] 3,803,973
[45] Apr. 16, 1974

[54] PLASTIC DRIVE FASTENER

[75] Inventor: George Martin Rapata, Park Ridge, Ill.

[73] Assignee: Illinois Tool Works Inc., Chicago, Ill.

[22] Filed: Nov. 9, 1972

[21] Appl. No.: 305,196

[52] U.S. Cl. ................. 85/80, 24/73 PF, 151/41.75
[51] Int. Cl. ............................................. F16b 13/06
[58] Field of Search ......... 85/80, 83, 5 R; 24/73 PF, 24/73 HS, 73 P, 73 PM, 73 PS, 73 D; 151/41.75

[56] References Cited
UNITED STATES PATENTS

| | | | |
|---|---|---|---|
| 3,342,098 | 9/1967 | Schuplin | 85/83 |
| 3,485,133 | 12/1969 | Rapata | 85/5 R |
| 3,574,899 | 4/1971 | Fisher | 85/80 |
| 3,678,797 | 6/1972 | Seckersom | 85/5 R |
| 3,701,373 | 10/1972 | Wronke et al. | 85/80 |
| 3,745,612 | 7/1973 | Seckersom | 85/5 R |

*Primary Examiner*—Marion Parsons, Jr.
*Attorney, Agent, or Firm*—Olson, Trexler, Wolters, Bushnell & Fosse, Ltd.

[57] ABSTRACT

The present invention relates generally to improvements in fasteners of the snap-in type for securing a plurality of workpieces or panels in fixed position relative to each other and more particularly to novel and very practical one-piece plastic snap-in type fasteners. Fasteners of the type contemplated by the present invention and disclosed herein include a head section, and an elongate shank section integral with and extending therefrom. The shank section is of novel design and is centrally apertured longitudinally for accommodating a fastener screw element. The disclosed fastener is substantially Z-shaped in cross-section in the vicinity of a shoulder adapted to engage the side of a workpiece oppositely disposed from the side engaged by the head of the fastener. A unique structural arrangement of the elongate shank section assures the subjection of a diagonal web portion thereof to stress upon initial insertion of the shank section within a work aperture, and a screw element is insertable within a longitudinal aperture centrally disposed within said diagonal web.

12 Claims, 17 Drawing Figures

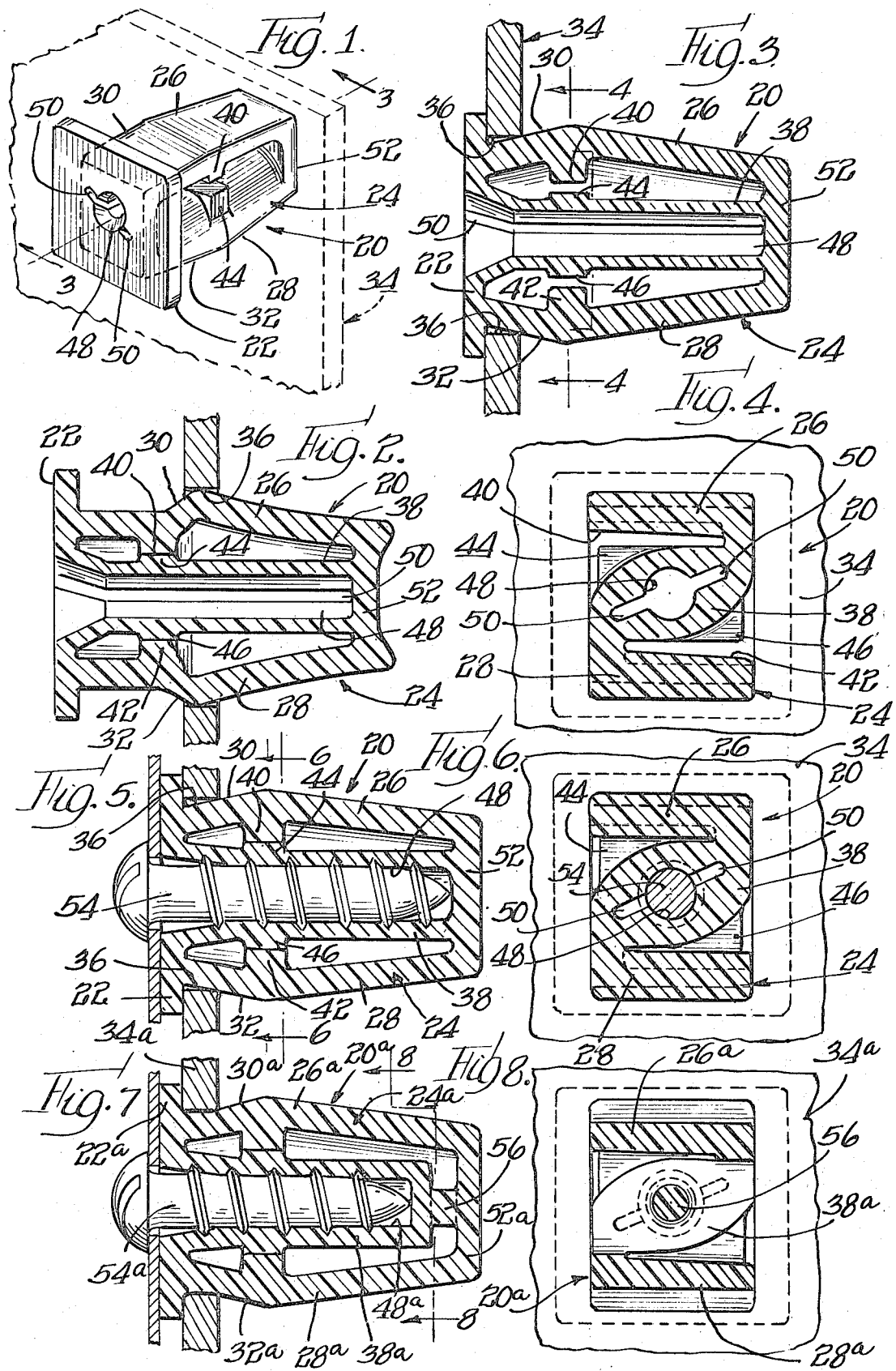

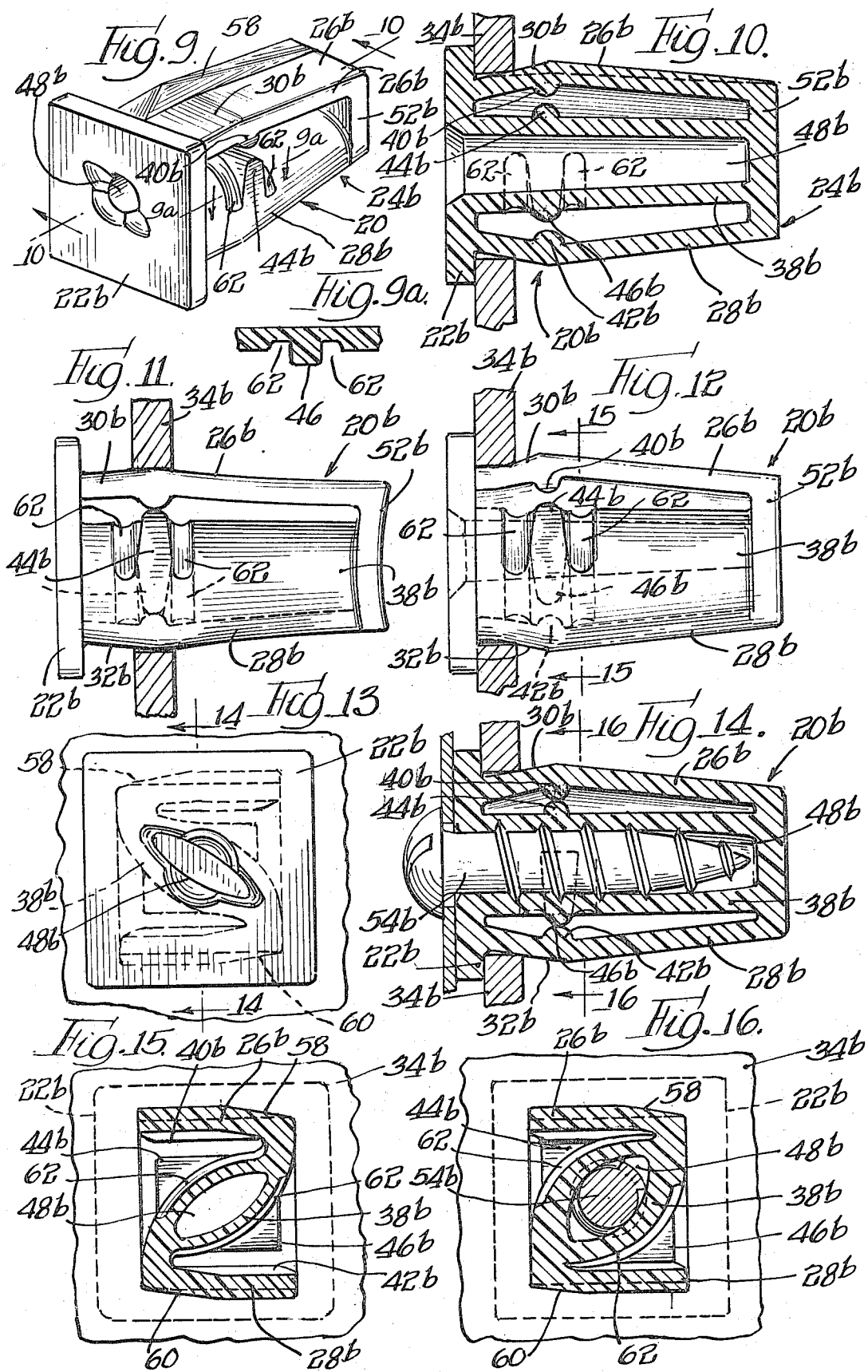

3,803,973

PLASTIC DRIVE FASTENER

SUMMARY OF THE INVENTION

One-piece plastic fasteners have heretofore been employed for securing work sheets or panels in juxtaposition, and experience has shown that in many instances considerable longitudinal force has been required to initially insert such fasteners within a work aperture. Also, some of the snap-in type plastic fasteners heretofore available, incorporate a shank section of generally Z-shaped cross-section which in certain applications do not impinge the apertured work with sufficient aggressiveness to assure against unintended or unauthorized dislodgement when subjected to normal environmental conditions.

It is therefore an important object of the present invention to provide an improved one-piece plastic drive or snap-in type fastener, having a shank of generally Z-shaped cross-section wherein auxiliary means may be employed to assure increased impingement aggressiveness and thus prevent unauthorized fastener dislodgment.

It is a further object of the present invention to provide a one-piece plastic drive fastener of the type referred to above wherein a novel structural arrangement of the fastener shank serves to reduce the amount of axial force required to initially insert the fastener within a work aperture.

The present invention also contemplates the provision of a one-piece drive fastener having the advantages set forth above, which may be manufactured at minimum cost by the practice of conventional methods of plastic molding.

BRIEF DESCRIPTION OF THE DRAWINGS

The foregoing and other objects and advantages will be more apparent when considered in connection with the accompanying drawings wherein:

FIG. 1 is a perspective view disclosing a one-piece plastic fastener of the type contemplated by the present invention completely inserted within an apertured panel structure and before a screw element has been inserted within the plastic fastener;

FIG. 2 is a central sectional view of the plastic drive fastener shown in FIG. 1, partially inserted within the work aperture with the maximum diameter of the fastener shank entering said aperture;

FIG. 3 is a central sectional view taken substantially along the line 3—3 of FIG. 1;

FIG. 4 is a transverse sectional view of a fastener taken substantially along the line 4—4 of FIG. 3;

FIG. 5 is a longitudinal sectional view of a fastener similar to FIG. 3 after a screw element has been inserted within the central longitudinal aperture provided in the diagonal portion of the drive fastener;

FIG. 6 is a transverse sectional view of a fastener taken substantially along the line 6—6 of FIG. 5;

FIG. 7 is a central sectional view similar to FIG. 5 illustrating a one-piece plastic fastener of slightly modified form.

FIG. 8 is a transverse sectional view taken substantially along the line 8—8 of FIG. 7;

FIG. 9 is a perspective view of another modified form of a one-piece snap-in or drive fastener contemplated by the present invention;

FIG. 9a is a fragmentary detail sectional view taken substantially along the line 9a—9a of FIG. 9;

FIG. 10 is a central sectional view taken substantially along the line 10—10 of FIG. 9 after the fastener has been completely inserted within the work aperture, but before the screw element has been applied thereto;

FIG. 11 is a side elevational view of the fastener as it is partially inserted within the work aperture with the area of maximum diameter entering said aperture;

FIG. 12 is a view similar to FIG. 11 disclosing the fastener after it has been completely inserted within the work aperture, but before a screw element has been applied thereto;

FIG. 13 is an end elevational view as seen from the left of FIG. 12;

FIG. 14 is a longitudinal sectional view taken substantially along the line 14—14 of FIG. 13;

FIG. 15 is a transverse sectional view taken substantially along the line 15—15 of FIG. 12; and FIG. 16 is a transverse sectional view taken substantially along the line 16—16 of FIG. 14.

DESCRIPTION OF PREFERRED EMBODIMENTS OF THE INVENTION

Referring now to the drawings more in detail wherein like numerals have been employed to designate similar parts throughout the various figures, it will be seen that a one-piece plastic drive fastener of the type contemplated by the present invention is designated generally by the numeral 20 in FIGS. 1 to 6, inclusive. The fastener 20 includes a head section 22, and an elongate shank section 24 extending axially therefrom and formed integral therewith. The shank section 24 is comprised of two oppositely disposed, structurally identical axially extending elongate shank portions 26 and 28.

The shank portion or plate 26 provides an inclined shoulder 30 and the shank portion 28 provides a similar inclined oppositely positioned work shoulder 32 for impinging the side of juxtapositioned sheet panel members 34 along an area oppositely disposed from the work surface engaged by the head section 22. The entering extremity of the shank section 24 is of reduced cross-sectional shape, to facilitate initial insertion of the fastener within a complementary aperture 36 of the work or panel structure 34.

A diagonal portion 38 of the shank structure 24 integrally connects diagonally opposed longitudinal margins of the shank portions 26 and 28, as clearly illustrated in FIGS. 4 and 6. Positioned in transverse alignment with the area of maximum diameter of the shank section 24 are lugs or abutment members 40 and 42 projecting from shank portions 26 and 28, respectively. These lugs 40 and 42 are adapted to engage complementary abutments or lugs 44 and 46, respectively, projecting from the diagonal shank portion 38.

Positioned centrally within and extending longitudinally of the diagonal shank portion 38 is a screw-accommodating aperture 48. Longitudinal diametrically positioned slots 50 communicate with the aperture 48 and serve to increase shank flexibility, and thereby facilitate insertion of the shank section within a work aperture. As the fastener shank 24 is telescopically associated with the work aperture 36, and the area of maximum diameter of the shank section, as illustrated in FIG. 2, engages the work surface which defines said aperture, said shank sections will experience both lateral contraction and longitudinal expansion extending beyond the closed extremity or end wall portion 52, as clearly illustrated in FIG. 2. At this point the protuberances 40 and 42 abut the complementary protuberances 44 and 46, respectively, but the shank section may be forced through the work aperture with a minimum application of force. In other words, the above described shank structure greatly facilitates the ease with which the shank may be initially applied. Likewise, after the shank section has been inserted to its final position, as illustrated in FIG. 3, the entering wall section 42 cooperating with the previously elongated shank portions 26 and 28 cause the shoulders 30 and 32 to engage the work with increased aggressiveness. As previously indicated, the presence of the longitudinal slots 50 also reduces the force necessary to collapse the shank section.

After the shank section 24 has been completely inserted, and before a screw element is applied within the longitudinal aperture 48, as clearly illustrated in FIG. 3, the protuberances or abutments 40 and 42 will have been yieldably urged outwardly so as to become disengaged from the complementary inner abutments 44 and 46, respectively. In FIG. 5 a screw element 54 is disclosed as having been rotatably inserted within the longitudinal aperture 48. Obviously, the normal internal diameter defined by the longitudinal opening 48 prior to the application of a screw thereto, must be less than the outer diameter of the threaded shank of the screw element 54. Hence, as the screw element is completely inserted within the fastener, as illustrated in FIG. 5, the protuberance 44 will be in firm impingement with the complementary protuberance 40, and likewise the protuberance 46 will firmly impinge the complementary protuberance 42. The fastener 20, under such circumstances, is secured against any possibility of unauthorized dislodgment from the work aperture. It should also be understood that as the screw element 54 is rotated in a tightening direction within the diagonal shank portion 38, it will force the diagonally opposite peripheral surfaces of the shank periphery into aggressive impingement with the surface of the work which defines the aperture 36. Hence, the tightening of the screw member within the fastener serves to increase the firmness with which the fastener is secured in place.

FIGS. 7 and 8 disclose a slightly modified drive fastener which is designated generally by the numeral 20a. The only structural difference between the previously described fasteners 20 and 20a is in the provision of a connector element 56 of reduced cross-section interposed between the end wall 52a and the diagonal portion 38a. All other parts of the fastener 28a corresponding with those previously described are identified by similar numerals bearing the suffix a. The presence of the connecting element 56 of reduced cross-section serves to increase the resistance to rotation experienced by the diagonal portion 38a as the screw element 54 is rotated within the longitudinal aperture 48a thereof. In instances where this reduction in resistance to rotation is required, the structure disclosed in FIGS. 7 and 8 will serve this intended purpose. It will be noted that in both the plastic fastener 20 and 20a the outer extremities of their respective longitudinal recesses 36 and 36a are countersunk to facilitate initial application of the entering extremity of the fastener screw element.

In FIGS. 9 to 16, inclusive, another modified form of the plastic fastener is designated generally by the numeral 20b. The fastener 20b is designed to accommodate applications where force required to longitudinally insert the fastener within a work aperture must be less than the axial force required to insert the previously described fasteners 20 and 20a, without impairment of the holding capacity of the fastener after the screw element has been applied to the completely inserted plastic shank. In many respects the fastener 20b is structurally similar to the previously described fastener 20, and therefore a number of the parts of the fastener 20b which correspond structurally and functionally with the fastener 20 are identified by corresponding numerals bearing the suffix b. A number of structural features are incorporated within the shank section 24b which contribute to the ease with which said shank section may be initially inserted within the work aperture. For example, one portion of the outer surface of the elongate shank portion 26b is relieved by providing a thinner area designated by the numeral 58, in FIG. 9, and in FIGS. 13, 15 and 16. Likewise, at diagonally located areas 60 of elongate shank portion 28b the thickness of the stock has been reduced so as to render this area more flexible. Also, oppositely disposed peripheral areas of the diagonal portion 38b have been recessed at 62 to increase the lateral flexibility thereof in the area of maximum diameter of the fastener periphery. Abutments 40b and 44b function similarly to the previously described abutments 40 and 44, and abutments 42b and 46b function similarly to the previously described abutments 42 and 46 to limit the extent to which the shank section may be collapsed upon insertion and to cooperate with the screw elements 54b in securing the fastener against dislodgment after the fastener has been finally secured within the apertured workpiece. To further increase the resistance to the collapsability of the shank section 38b, the elongate aperture 48b is generally elliptical in cross-sectional shape. This precludes the necessity of employing the previously mentioned longitudinal slots 50 and 50a of the plastic fasteners 20 and 20a, respectively.

From the foregoing it will be apparent that the one-piece plastic fastener device contemplated by the present invention is produced by conventional molding methods, hence assuring economy in the cost of manufacture. In the foregoing description the protuberances 40, 42, 44 and 46 may aptly be referred to as pressure pads which cooperate with the diagonal web 38 and flexible arms 26 and 28 so as to cause aggressive impingement with the work upon the application of the screw element. These pads also cooperate upon the initial insertion of the plastic shank section to actually cause the shank portions 26 and 28 to become elongated, thereby subjecting the entering end wall of the fastener to stress. This stressing of the entering wall section which results from the above-mentioned elongation of the end portions 26 and 28 serves effectively to increase the ultimate impinging aggressiveness of the shank surfaces 30 and 32 against the work, once the shank section has been completely inserted within the work aperture. Increase in lateral flexibility of the shank portions 26b and 28b as illustrated in FIGS. 9 to 16, inclusive, serves not only to facilitate initial insertion of the plastic fastener, but also to facilitate the responsiveness of the shank section in expanding upon the application of the screw element. It should also be understood that the diagonal shank portion or web may be supported by the head section without integral connection of the entire longitudinal extent thereof with the shank portions 26, 26c and 26b in applications where such construction is discernable. The fastener contemplated by the present invention may be mounted within a single apertured sheet or panel in instances where it is necessary for the fastener to support other elements.

For the purpose of illustrating practical applications of drive fasteners constructed in accordance with the teachings of the present invention, certain specific embodiments have been disclosed and described herein. It should be understood, however, that the present invention contemplates other structural modifications and changes without departing from the spirit and scope of the appended claims.

I claim:

1. A one-piece plastic fastener including an elongate shank section insertable within a complementary workpiece aperture, a head section from which said shank section extends, said head section having a clamping surface for engaging one side of an apertured workpiece when said shank section has been fully inserted therein, said shank section having an enlargement intermediate the extremities thereof providing shoulder means for engaging the side of the workpiece oppositely disposed from the side which is engaged by said head section, said shank section in the vicinity of said enlargement being generally Z-shaped in transverse cross-section, presenting a pair of laterally spaced, longitudinal shank elements depending from said head section and defining outer peripheral, oppositely disposed work-engaging surfaces, and a longitudinal web section diagonally positioned between a pair of longitudinal margins of said shank elements and providing a yieldable transverse strut, whereby to assure subjection of said diagonal web to stress upon insertion of the shank section within said work aperture, the maximum cross-sectional area defined by the radially outermost points of the shank periphery being normally greater than the size of a complementary work aperture for accomodating said shank section, said web having a longitudinal screw accommodating aperture for securing said shank within a work aperture, and the free extremity of said shank section being of reduced cross-sectional dimension to facilitate insertion thereof within a work aperture.

2. A one-piece plastic fastener as set forth in claim 1 wherein abutment means is provided for limiting the extent to which the maximum size of the shank section may be reduced upon insertion thereof within a complementary work aperture.

3. A one-piece plastic fastener as set forth in claim 2 wherein said abutment means comprises engageable pad elements associated with said web and longitudinal shank elements.

4. A one-piece plastic fastener as set forth in claim 1 wherein predetermined areas of the longitudinal shank elements are reduced in thickness to increase lateral yieldability of said shank elements.

5. A one-piece plastic fastener as set forth in claim 1 wherein limited areas of said web section are of reduced thickness to enhance the lateral flexibility of said section.

6. A one-piece plastic fastener as set forth in claim 5 wherein said limited areas of reduced thickness are located in the vicinity of the maximum size of said shank section.

7. A one-piece plastic fastener as set forth in claim 1 wherein the diagonal web section is provided with oppositely disposed pads and wherein areas of said web section in the vicinity of said pads are of reduced thickness to enhance the flexibility of said web section.

8. A one-piece plastic fastener as set forth in claim 1 wherein the entering extremity of the shank section includes a wall section traversing the entering extremities of said longitudinal shank elements.

9. A one-piece plastic fastener as set forth in claim 1 wherein an axially extending element of reduced cross-section connects the entering extremity of said web section with a wall section traversing the entering extremities of said longitudinal shank elements.

10. A one-piece plastic fastener as set forth in claim 1 wherein the longitudinal screw-accommodating aperture is generally elliptical in cross-sectional shape in the vicinity of the area of maximum diameter of said shank section.

11. A one-piece plastic fastener as set forth in claim 1 wherein the longitudinal screw accommodating aperture includes a central portion which is substantially circular in cross-section and portions radiating from said central portion whereby to enhance the flexibility of said web section.

12. A one-piece plastic fastener as set forth in claim 1 wherein the entering extremities of the shank elements are connected by a transverse wall section and wherein the disposition of said shank elements with respect to said web section is such that when the area of maximum diameter of the shank section is axially shifted into a position of engagement with the surface of the work defining the shank accommodating aperture, said shank elements will experience elongation.

* * * * *